(12) United States Patent
Wade et al.

(10) Patent No.: US 11,215,826 B2
(45) Date of Patent: Jan. 4, 2022

(54) SEALED EDGE LENS FOR NEAR EYE DISPLAY

(71) Applicant: INTEL CORPORATION, Santa Clara, CA (US)

(72) Inventors: Andrew G. Wade, San Clemente, CA (US); Andrew Dawn, San Francisco, CA (US); John Groff, San Francisco, CA (US); Mickael Guillaumee, Neuchatel (CH); William Maginn, San Francisco, CA (US)

(73) Assignee: INTEL CORPORATION, Santa Clara, CA (US)

( * ) Notice: Subject to any disclaimer, the term of this patent is extended or adjusted under 35 U.S.C. 154(b) by 754 days.

(21) Appl. No.: 15/201,352

(22) Filed: Jul. 1, 2016

(65) Prior Publication Data
US 2018/0003976 A1   Jan. 4, 2018

(51) Int. Cl.
| G02B 27/01 | (2006.01) |
| G02B 5/32 | (2006.01) |
| H04N 9/31 | (2006.01) |
| B29D 11/00 | (2006.01) |
| B29K 75/00 | (2006.01) |

(52) U.S. Cl.
CPC .... *G02B 27/0172* (2013.01); *B29D 11/00403* (2013.01); *B29D 11/00442* (2013.01); *B29D 11/00932* (2013.01); *G02B 5/32* (2013.01); *H04N 9/3141* (2013.01); *B29K 2075/00* (2013.01); *G02B 2027/014* (2013.01); *G02B 2027/0174* (2013.01); *G02B 2027/0178* (2013.01)

(58) Field of Classification Search
None
See application file for complete search history.

(56) References Cited

U.S. PATENT DOCUMENTS

| 2006/0192306 A1* | 8/2006 | Giller | B29C 39/006 264/1.7 |
| 2016/0033771 A1* | 2/2016 | Tremblay | G02B 27/0172 345/8 |

* cited by examiner

*Primary Examiner* — Stephen T. Reed
(74) *Attorney, Agent, or Firm* — Kacvinsky Daisak Bluni PLLC

(57) ABSTRACT

Disclosed herein is a lens for a wearable projection system. The lens includes a holographic optical element disposed between layers of the lens. Joints between the holographic optical element and the lens layers on an edge of the lens are covered with a sealant to protect the holographic optical element.

24 Claims, 12 Drawing Sheets

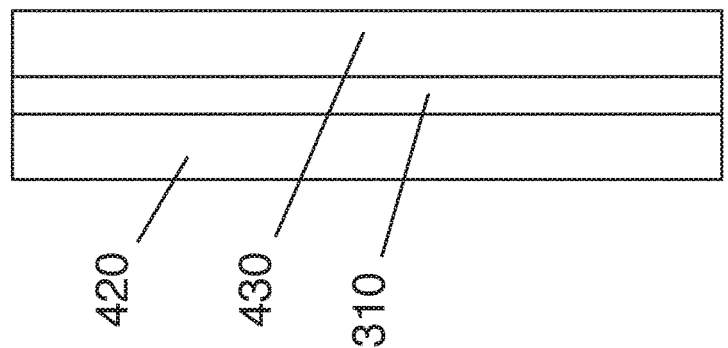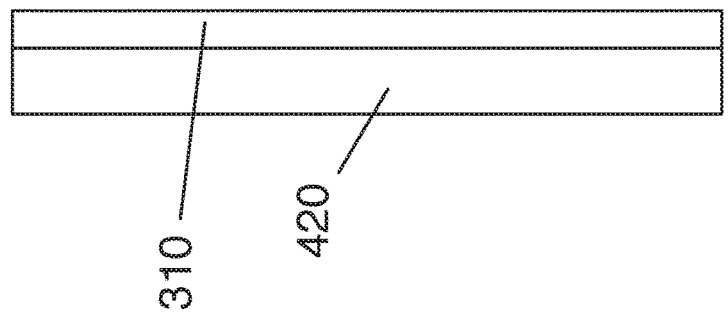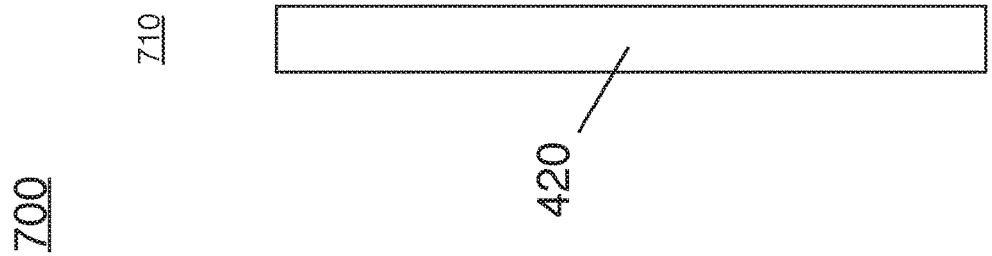

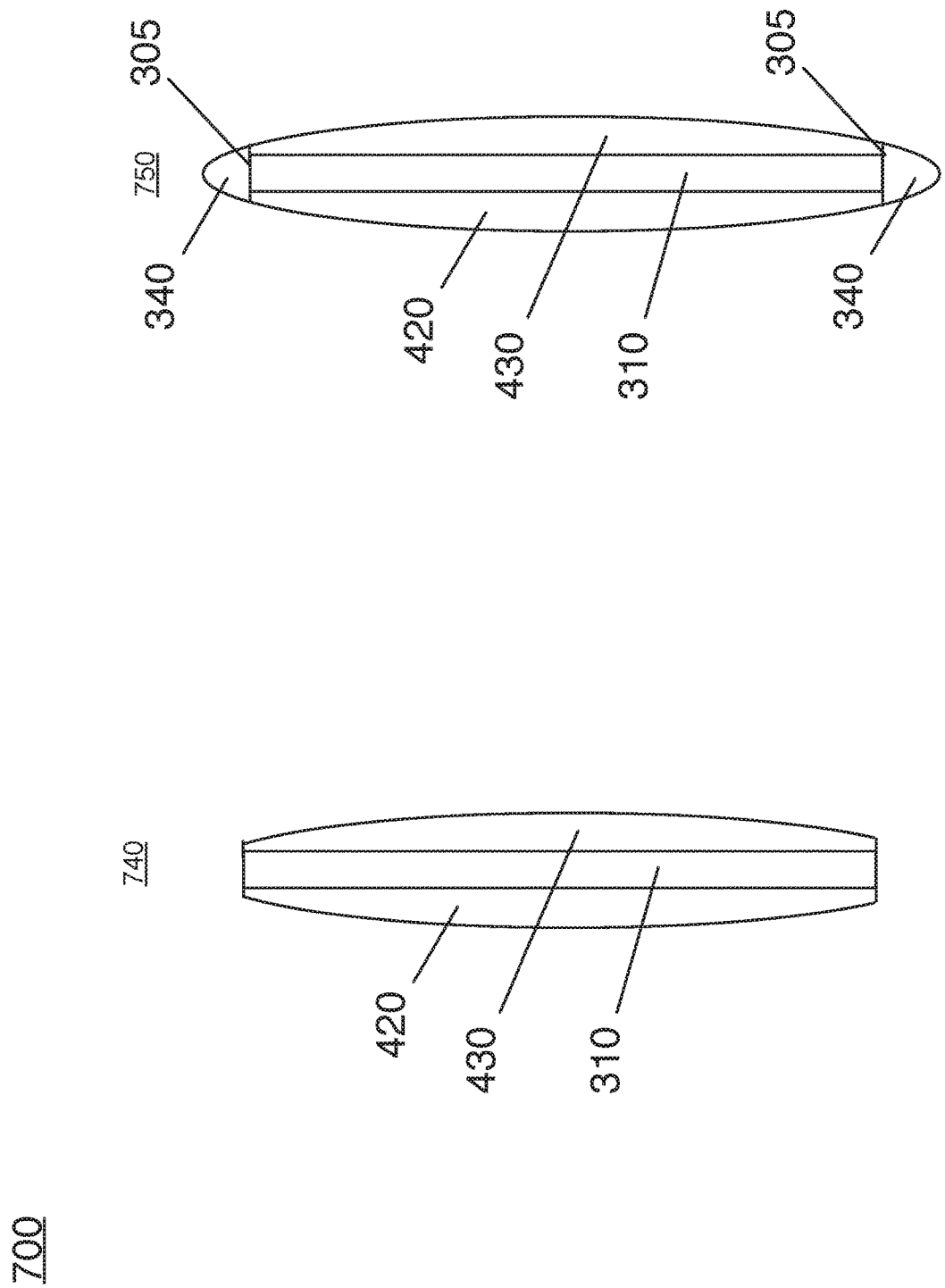

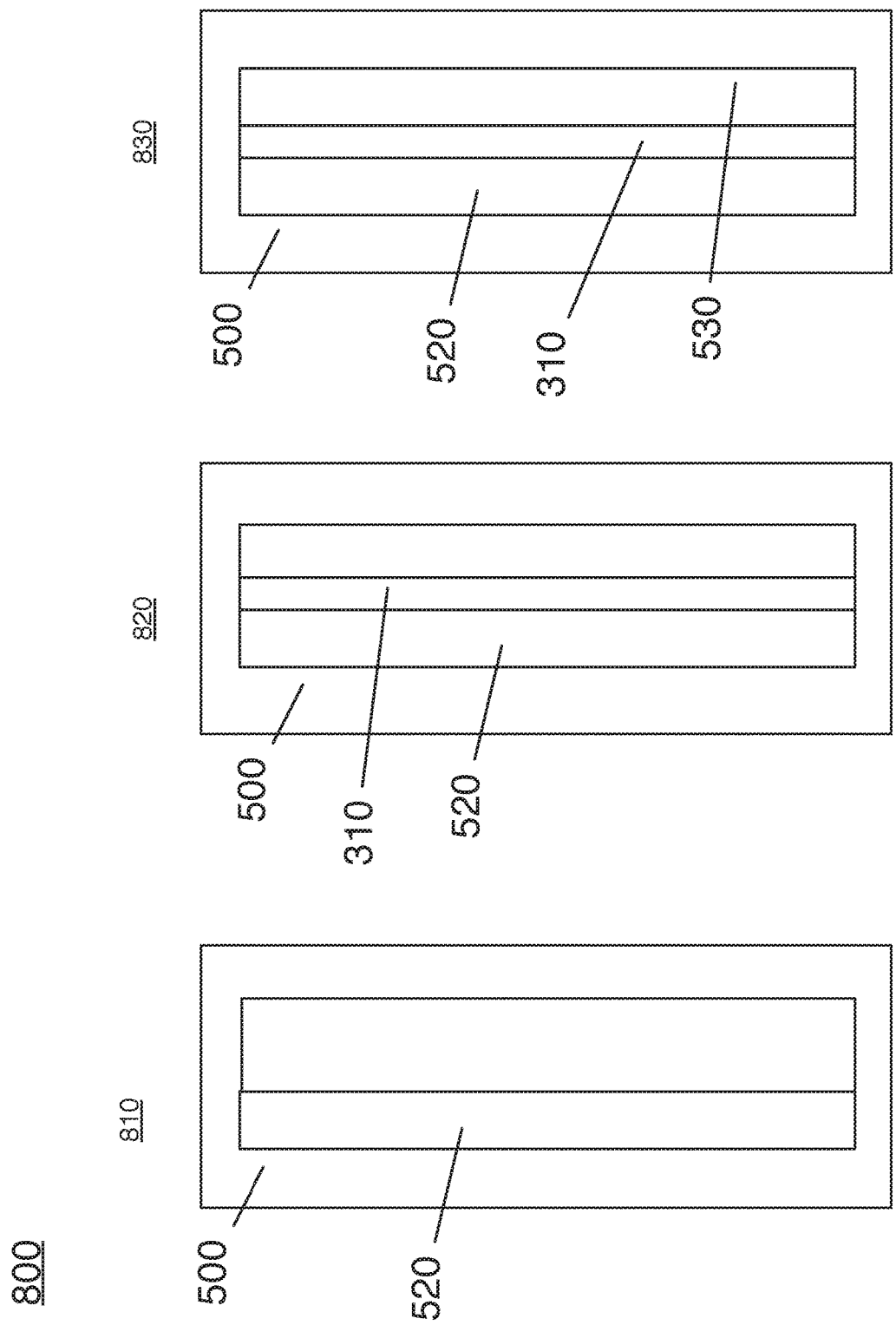

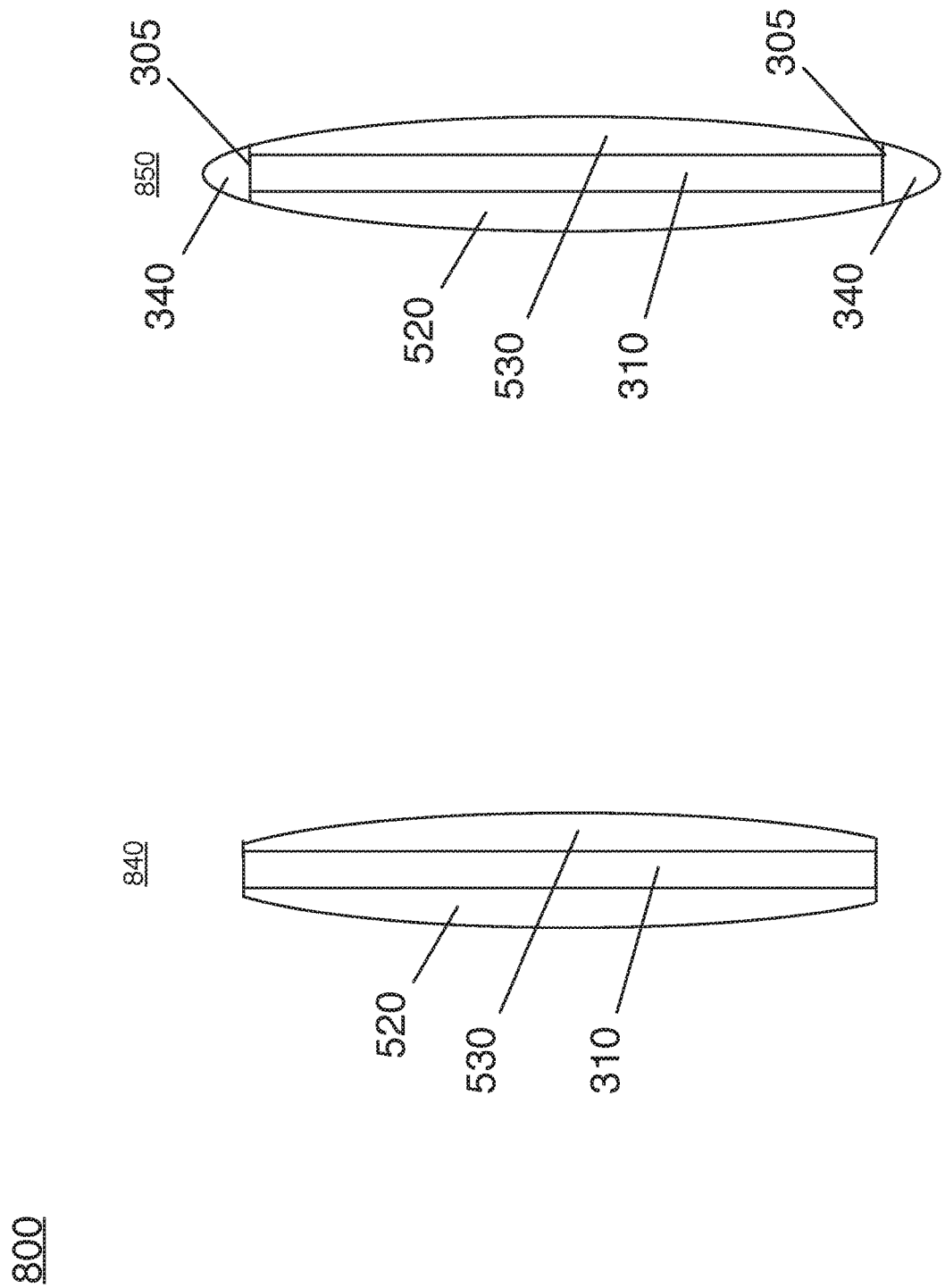

SEALED EDGE LENS FOR NEAR EYE DISPLAY

TECHNICAL FIELD

Embodiments herein generally relate to head worn displays and heads up displays; and in particular to lenses for such displays.

BACKGROUND

Modern display technology may be implemented to provide head worn displays (HWD) and to see through the display and to see information (e.g., images, text, or the like) in conjunction with the see through display. Such displays can be implemented in a variety of contexts, for example, defense, transportation, industrial, entertainment, wearable devices, or the like.

In particular, an image may be reflected off a transparent projection surface to a user's eye to present an image in conjunction with a real world view. Conventionally, HWD systems have extremely difficult tradeoffs between various design and utility considerations, such as, for example, bulk, form-factor, see-through quality, field of view, etc. For example, achieving a normal eyewear form factor without bulk has not been achieved in a commercial head mounted display.

BRIEF DESCRIPTION OF THE DRAWINGS

FIGS. 7A-7E illustrate an example first technique.
FIGS. 8A-8E illustrate an example second technique.

DETAILED DESCRIPTION

Figure 2:
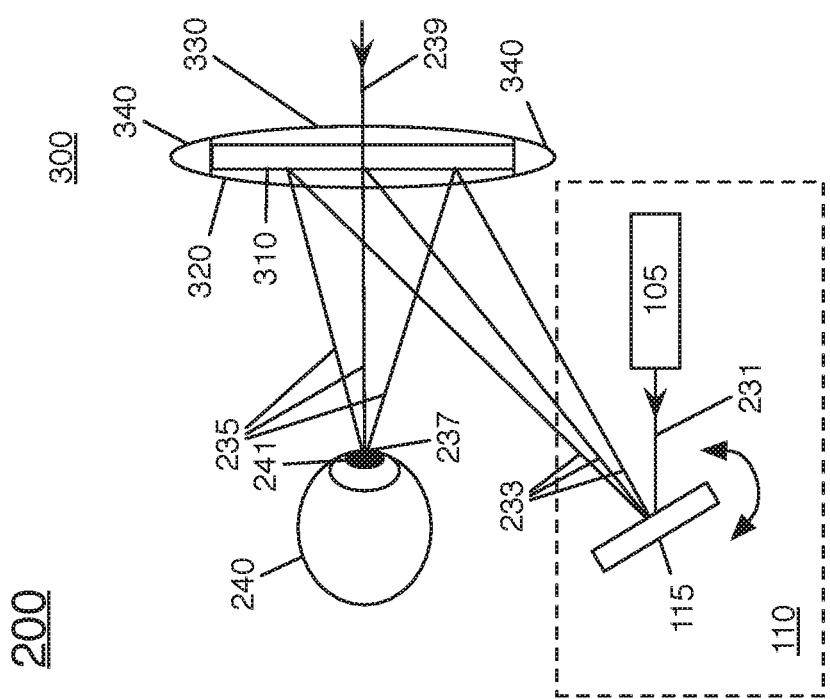
FIG. 2 illustrates an example second system.

Various embodiments may be generally directed to head worn displays (HWDs) and specifically to cast lenses for a head worn display. In general, HWDs provide a projection system and a lens that includes a holographic optical element (HOE). The projection system and the lens can be mounted to a frame to be worn by a user, for example, glasses, a helmet, or the like. During operation, the projection system projects an image onto an inside (e.g., proximate to the user) surface of the lens. The HOE reflects the image to an exit pupil (or viewpoint). Ideally, the exit pupil is proximate to one of the user's eyes, and specifically, to the pupil of the user's eye. As such, the user may perceive the reflected image.

In some examples, HWDs can be implemented to provide a projection system along with a lens that includes a holographic optical element (HOE). Conventionally, the HOE is laminated onto an exterior surface of the lens. In particular, the HOE is laminated over an entire surface of the backside of the lens. Occasionally, a protective layer may be added on top of the HOE to protect the HOE. However, during final shaping of the lens, the edges of the HOE may be exposed resulting in delamination of the HOE and/or the protective coating from the lens.

The present disclosure provides to form a lens from an HOE and to seal the edges of the lens. In particular, a lens could be formed by laminating an HOE between two lens blanks. As another example, a lens can be formed by injecting lens material into a mold, adding the HOE into the mold, and then injecting more lens material into the mold. Subsequently, the lenses can be shaped and sealant added to the lens edges to seal the joints between the layers and protect the HOE from contamination, delamination, or the like.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, known structures and devices are shown in block diagram form in order to facilitate a description thereof. The intention is to provide a thorough description such that all modifications, equivalents, and alternatives within the scope of the claims are sufficiently described.

Additionally, reference may be made to variables, such as, "a", "b", "c", which are used to denote components where more than one component may be implemented. It is important to note, that there need not necessarily be multiple components and further, where multiple components are implemented, they need not be identical. Instead, use of variables to reference components in the figures is done for convenience and clarity of presentation.

Figure 1:
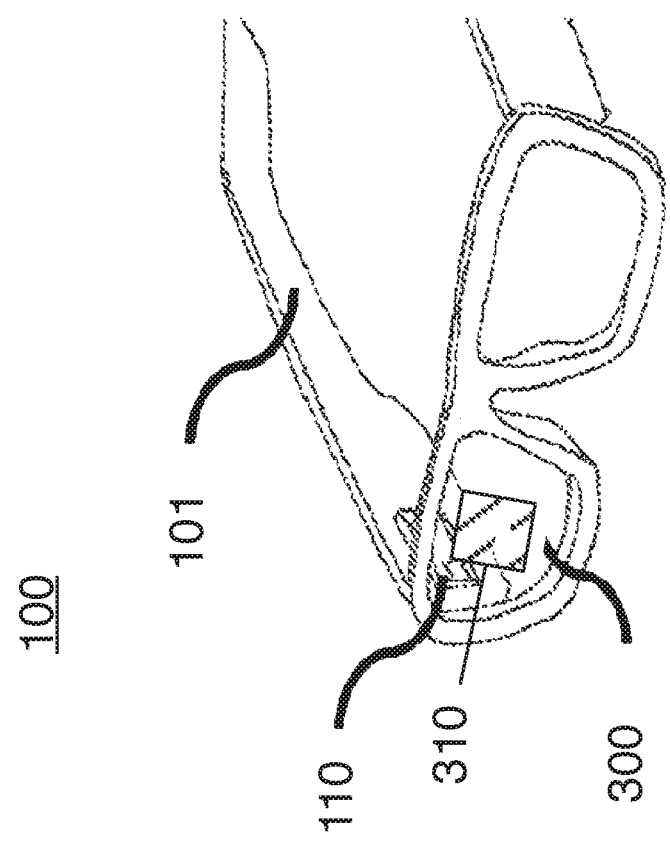
FIG. 1 illustrates an example first system.

FIG. 1 illustrates an example of device 100 arranged according to the present disclosure. It is noted, that the device of this figure is depicted implemented as a pair of glasses. However, with some examples, the device 100 may be embodied as a pair of glasses (e.g., as depicted), as a pair of binoculars, a monocular device (e.g., scope, or the like), as goggles, as a helmet, as a visor, as a wearable device, or the like. Embodiments are not limited in this context.

In general, the device 100 is configured to provide a virtual display. In some examples, the device 100 may provide a virtual display in conjunction with a real world view. The device 100 includes a glasses frame 101 and a projection system 110 mounted to the frame 101. Additionally, the device 100 includes a projection surface 300, which may be a lens, such as, for example, a glasses lens as depicted. For convenience and clarity in discussing the present disclosure, the projection surface 300 is referenced as lens 300. However, embodiments are not limited in this context.

The lens 300 can be removably mounted in the frame 101. The lens 300 includes an HOE 310 (also referred to as a holographic optical combiner). The HOE 310 may be in a particular location and/or have particular optical characteristics to selectively reflect light incident on the lens 300 to an exit pupil (e.g., the exit pupil 237 shown in FIG. 2). It is important to note, the HOE 310 is depicted as covering only a portion of the viewable area of the lens 300. However, in some examples, the HOE may cover substantially all, or all, of the viewable area of the lens 300.

During operation, the projection system 110 projects light onto the lens 300. The projected light can correspond to virtual images. The lens 300, and specifically the HOE 310, reflects (or redirects) the light towards a user's eye. More particularly the HOE 310 reflects the projected light (e.g., the projected image, or the like) to an exit pupil. This is described in greater detail with respect to FIG. 2. With some examples, the lens 300 and the HOE 310 redirect the projected images and also transmit light from the external environment to the user's eye. As such, a virtual image and a real world image may be presented to the user. It is noted, that although the device 100 is depicted with a single projection system 110 and lens 300, the device 100 may include a projection system 110 and lens 300 including an HOE 310 for each eye. Examples are not limited in this context.

With some examples, the projection system 110 may comprise a light source, battery, and projector to project images onto the HOE 310. For example, the projection system 110 may comprise a scanning mirror to reflect and redirect light from the light source onto the HOE 310. In some examples, the scanning mirror may be a microelectromechanical system (MEMS) based scanning mirror. In some examples, the projection system 110 may comprise a panel micro display (e.g., light emitting diode (LED) panel, liquid crystal display (LCD) panel, or the like). Additionally, the projection system 110 may include control and graphics processing components configured to cause the system 110 to emit light from the light source and to scan and/or project the emitted light onto the lens 300 to project an image onto the HOE 310.

The lens 300 is described in greater detail below, for example, with respect to FIG. 2 and FIG. 3. However, a general description of the lens 300 is given here. With some examples, the lens 300 is an at least partially transparent surface with the HOE 310 disposed between layers of the lens 300. More specifically, the lens 300 includes multiple layers with the HOE 310 sandwiched or placed between the layers. During operation, the lens 300 and the HOE 310 may transmit light incident on a real world side of the lens 300 to provide a real world view. In some examples, the lens 300 is opaque and the lens 300 does not transmit light incident on a real world side of the lens 300. The HOE 310 may have particular optical characteristics to reflect an image projected onto an internal surface of the lens 300 to an exit pupil in a particular location. With some examples, the lens 300 may be sunglass lenses to reduce an amount or type of light transmitted through the lenses, for example, by polarization or absorption. With some examples, the lenses 300 may be prescription lenses to correct or augment light perceived from the real world and/or the virtual image.

For example, FIG. 2 is a block diagram illustrating a side view of a system 200 including an example implementation of the device 100. In general, the exemplary implementation of the device 100 depicted in this figure is configured to project light to an exit pupil 237 (e.g., proximate to, or directed at, a user's eye, or the like). That is, the device 100 is configured to reflect the image projected onto an HOE 310 to a virtual aperture (e.g., the exit pupil 237) in the optical system. The system 200 includes the projection system 110 including a light source 105 to emit a light beam 231 of at least one wavelength. Alternatively, the system 110 may receive light emitted from a source not included in the system. Examples are not limited in this context. The light beam 231 is incident on (or received by) a scanning mirror 115. The scanning mirror 115 rotates about a number of axes to scan the light beam 231 in angles 233.

The scanning mirror 115 scans the light beam 231 in angles 233 onto (or across) the lens 300 while the system 110 modulates or modifies the intensity of the scanned light beam 231 to correspond to a digital image. In particular, the scanning mirror 115 scans the light beam 231 over an area of lens 300 while the system 110 projects a digital image onto a portion of the area that includes the HOE 310.

The lens 300 comprises a first and a second lens half 320 and 330. In some examples, the lens halves 320 and 330 are referred to as lens blanks or lens portions. Disposed between the lens halves 320 and 330 is the HOE 310. It is important to note, that the lens halves 320 and 330 may not necessarily correspond to an exact half portion of the lens 300. For example, the first lens blank can correspond to more than half of the total volume of the lens 300 while the second lens blank can correspond to less than half of the total volume of the lens 300. Examples are not limited in this context. Furthermore, in some instances, the lens halves 320 and/or 330 are referred to as a frontside lens portion or a backside lens portion. However, reference to frontside or backside is not intended to imply an orientation with respect to a user's eye, but merely to describe the relationship between each lens half and the HOE embedded between the lens halves.

Additionally, the lens 300 includes edge sealant 340. In general, during manufacturing, once the HOE 310 is disposed between the lens halves 320 and 300, the lens is shaped. The shaping process can include cutting, grinding, polishing, etc. Once the lens is shaped, sealant 340 can be applied to the lens edge. It is noted, that the sealant 340 is depicted of a size and shape to facilitate understanding. However, the size and shape of the sealant 340 may depend upon the sealant material, the application technique, the profile of the lens edge, or the like. Examples are not limited in this context.

As depicted, the HOE 310 is disposed between the lens halves 320 and 330. It is noted, that a variety of styles of HOEs may be implemented as the HOE 310. Furthermore, the HOE 310 may be manufactured by any of variety of manufacturing techniques, such as, for example, recording a hologram into a medium. For example, the HOE 310 may be a combiner lens (e.g., a holographic optical combiner lens, or the like) that reflects light (e.g., off-angle light, or the like) incident on a first surface while transmitting light incident on a second opposite surface. Examples are not limited in this context.

Accordingly, during use, the lens 300 reflects the light 233 as diffracted light 235 to an exit pupil 237. Thus, the lens 300 reflects and diffracts the light 233 to the entrance pupil 241 of a user's eye 240. Furthermore, the lens 300, and particularly the HOE 310, transmits light 239, which is incident on a front side of the lens 300 and HOE 310. As depicted, the line of sight 243 of the eye (e.g., corresponding to the eye pupil 241) is aligned with the exit pupil 237 and with the light 239. As such, the user may perceive a virtual image (e.g., as projected to exit pupil 237) in conjunction with a real world view (e.g., corresponding to light 239).

It is noted, that although only a single input pupil (e.g., light beam 231) and a single exit pupil (e.g., the exit pupil 237) are depicted, embodiments may be implemented to receive multiple input pupils and project an image with multiple exit pupils (e.g., based on a single input pupil or from multiple input pupils). Examples are not limited in this context.

Figure 3:
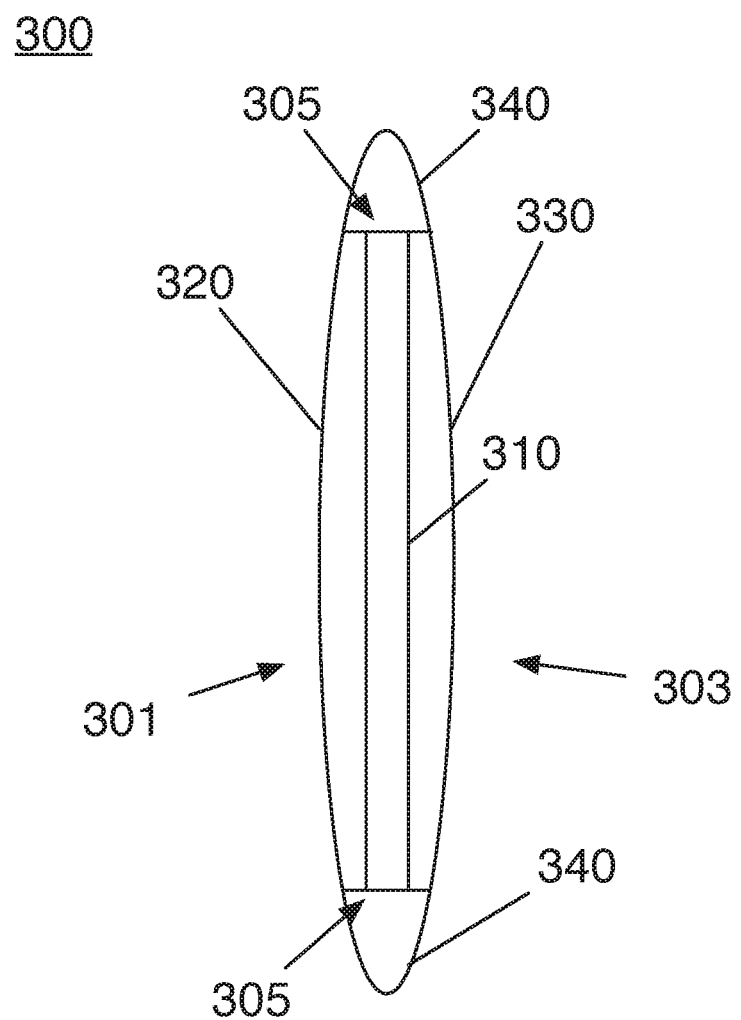
FIG. 3 illustrates an example lens for a projection system.

FIG. 3 illustrates the lens 300, arranged according to at least one example of the present disclosure in greater detail. In particular, FIG. 3 depicts a cut-away side view of the lens 300. As depicted, the lens 300 includes a first lens portion 320 and a second lens portion 330. Disposed between the portions 320 and 330 is the HOE 310. Various techniques for manufacturing the lens 300, and particularly, placing the HOE 310 between the portions 320 and 330 are described below, for example, with respect to FIGS. 6-7. The lens 300 includes a front side 301 and a backside 303. It is noted, the front side 301 and the back side 303 is depicted for purposes of clarity only and not to be limiting. However, in some examples, the front side 301 may be facing the environment while the backside 303 may be facing the user or viewer. Furthermore, the lens 300 includes an edge portion 305. The edge portion 305 may be the face of the lens where the lens portions 320 and 330 as well as the HOE 310 are joined. In some examples, during manufacturing, the edge 305 of the lens 300 may be cut and/or ground to expose material of the lens portions 320 and 330 as well as the HOE 310. This edge 305 of the lens 300 is covered with sealant 340 to protect the HOE 310 and the joints between the HOE 310 and the layers 320 and 330.

In general, the lens 300 comprises portions 320 and 330 with HOE 310 disposed between the lens portions 320 and 330. In some examples, the lens portions 320 and 330 can be prefabricated and the lens 300 assembled from prefabricated components. In other examples, the lens portions 320 and 330 can be fabricated during assembly of the lens 300.

Figure 4A:
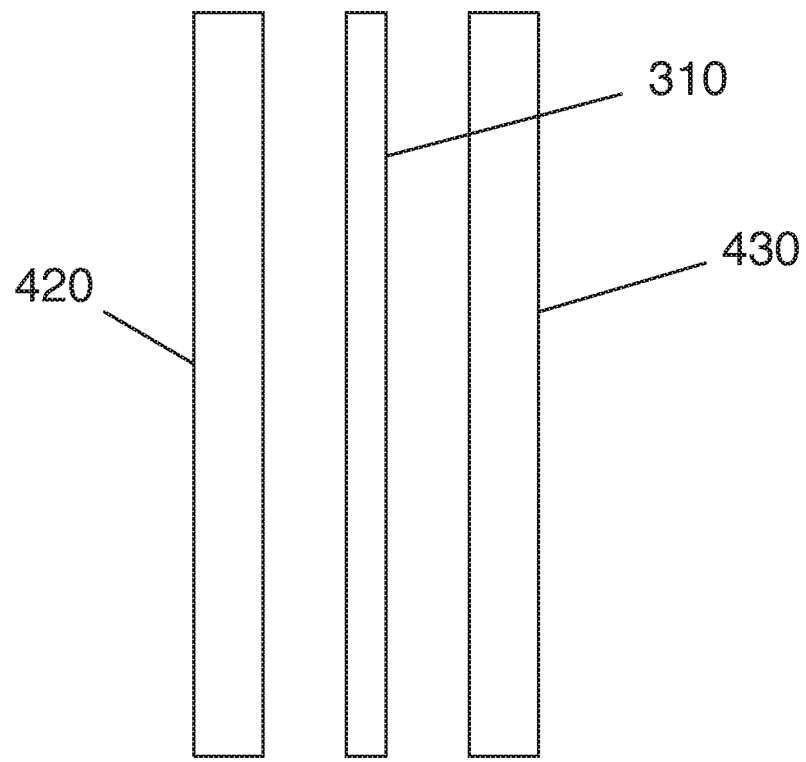
FIGS. 4A-4B illustrates example components for the lens of FIG. 3.
Figure 4B:
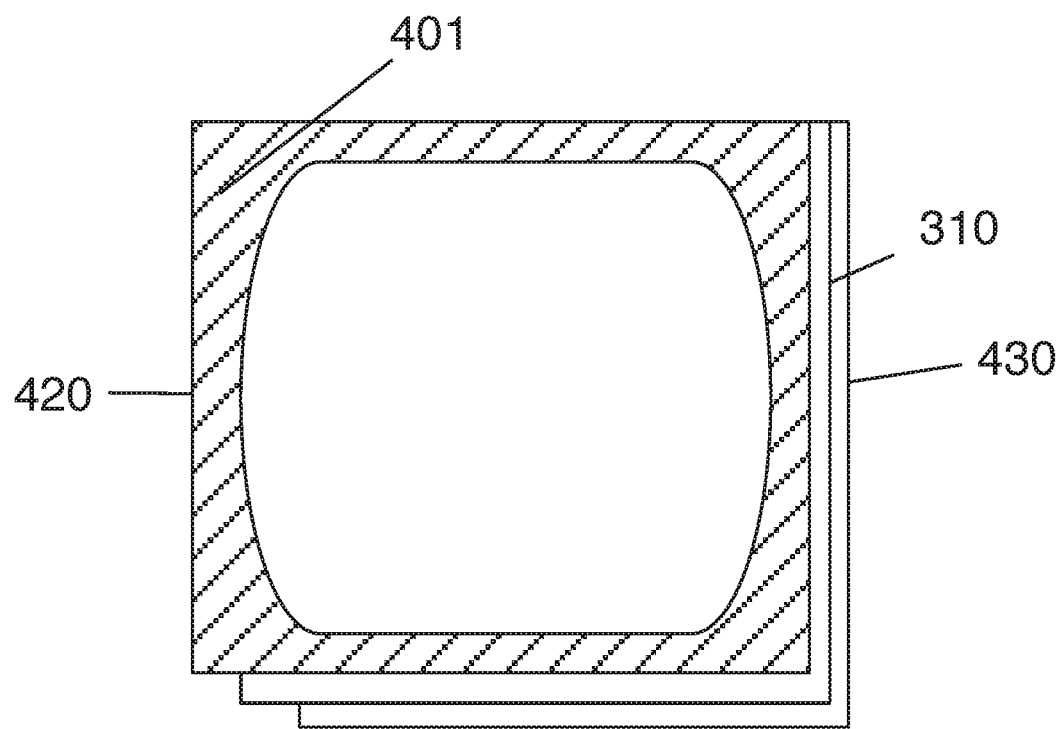

FIGS. 4A-4B depicts lens components 400 that can be provided to assemble lens 300, according to at least one example of the present disclosure. In particular, FIG. 4A depicts the lens components from a side view while FIG. 4B depicts the lens components from a front view. Turning more particularly to FIG. 4A, as depicted, lens component 400 can include a first lens blank 420 and a second lens blank 430. The lens blanks 420 and 430 can be prefabricated from a material, such as, for example, glass, or the like. The lens blanks 420 and 430 can be provided along with the HOE 310. In some examples, the HOE 310 can be a thermoformed sheet of holographic optical material which is sized to be placed between lens blanks 420 and 430. The HOE 310 can be affixed to the lens blank 420, for example, via a pressure sensitive adhesive. Likewise, the lens blank 430 can be affixed to the HOE, for example, via a pressure sensitive adhesive.

Turning more particularly to FIG. 4B, the lens components 400 are depicted. As noted herein, the lens 300 can be shaped, for example, to have an eyewear lens shape, or another shape suitable for a near eye display. During the shaping process, portions 401 of the lens can be removed. For example, portions 401 can be removed via cutting, grinding, buffing, polishing, or the like. The removed portions may further expose the edge 305 where the joint between the HOE 310 and the layer (e.g., the layer 420 and 430, or the like) is disposed. Accordingly, sealant (e.g., sealant 340, or the like) can be added to the edge to protect the HOE 310 and the joint between the HOE 310 and the layers.

Figure 5:
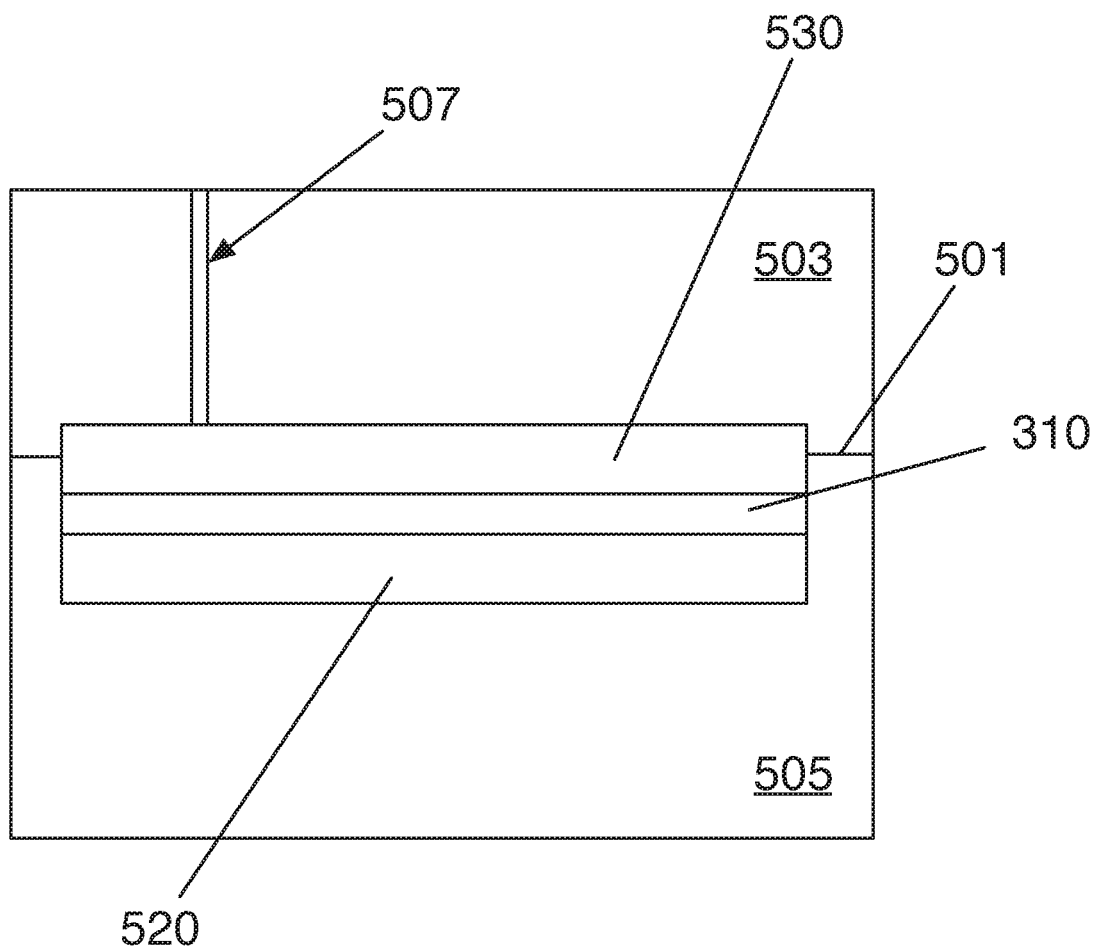
FIG. 5 illustrates an example mold for manufacturing the lens of FIG. 3.

FIG. 5 depicts a mold 500 that can be used to form lens components during assembly of the lens 300, according to at least one example of the present disclosure. The mold 500 includes a seam 501 between bottom mold portion 503 and top mold portion 505. The top mold portion 505 includes a port 507 into which material can be injected (or cast, etc.) to form lens blanks 520 and 530. In general, first lens portion 520 can be formed by injecting a first amount of lens material (e.g., a polymer material, such as, for example, polyurethane, Trivex, or CR39, or the like) via the port 507. The HOE 310 can then be placed into the mold. For example, the mold can be opened at seam 501, or the like. Then, another amount of lens material can be injected into the mold via the port 507 to form the second lens portions 530. As such, the HOE can be disposed between lens portions 520 and 530.

It is important to note, that multiple molds could be employed to form the lens 300 having lens portions 520 and 530 depicted in this figure. For example, a first mold could be employed to form the first lens portion 520 and then the first lens portion 520 and the HOE 310 could be placed into a second mold to form the second lens portion 530. Examples are not limited in this context. It is important to note, that the HOE 310 could be placed into a mold (e.g., mold 500, or the like) and both lens portions 520 and 530 molded around HOE 310, for example, in a single injection or casting process.

Figure 6:
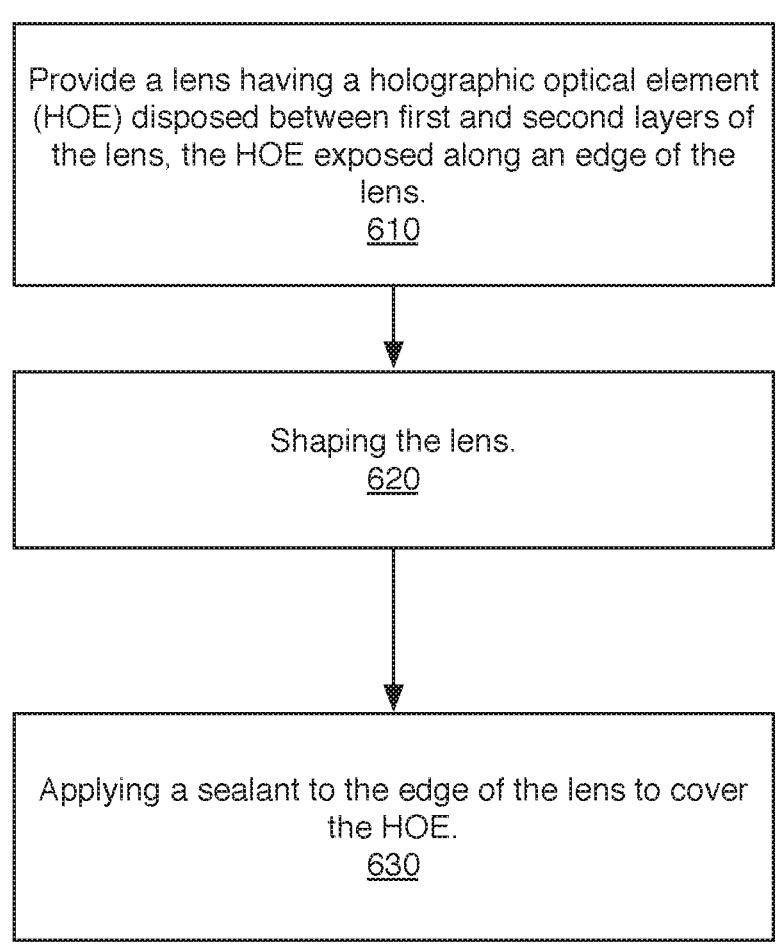
FIG. 6 illustrate an example logic flow.

FIG. 6 depicts a logic flow 600 for manufacturing a lens according to at least one example of the present disclosure. In some examples, the logic flow 600 can be implemented to manufacture the lens 300. It is noted, that the logic flow 600 could be implemented to form the lens 300 having lens portions 420 and 430 or 520 and 530. Examples are not limited in this context. The logic flow 600 may begin at block 610. At block 610 "provide a lens having a holographic optical element (HOE) disposed between first and second layers of the lens, the HOE exposed along an edge of the lens" the lens 300 can be provided. In particular, the HOE 310 disposed between lens portions 320 and 330 can be provided. In some examples, the lens 300 can be provided from prefabricated lens layers (e.g., the layers 420 and 430, or the like) while in other examples, the lens 300 can be provided from manufacturing the layers using mold (e.g., the mold 500, or the like).

Continuing to block 620 "shape the lens" the lens can be shaped. For example, the lens 300 can be shaped via cutting, grinding, or the like. In some examples, material (e.g., material 401 depicted in FIG. 4B, or the like) can be removed from the lens to provide the lens having an eyewear lens shape.

Continuing to block 630 "apply a sealant to the edge of the lens to cover the HOE" sealant can be applied to the lens to cover the edge where the joint between the HOE and the layers is. The lens 300, and particularly, the edge 305 of the lens 300 can be rolled on a wheel to apply sealant to the edge 305. As another example, the edge 305 can be dipped into a sealant. As another example, the edge 305 can be coated via a spray or aerosol technique. Examples are not limited in this context.

FIGS. 7A-7E depict an example technique 700 to form a lens. The technique 700 can be implemented to from the lens 300, for example, using lens components 400. It is noted, the technique 700 is described with reference to the lens 300 and the components 400 for purposes of clarity of presentation and not to be limiting. The technique 700 can begin at block 710. Turning to FIG. 7A and block 710, the lens layer 420 can be provided. Turning to FIG. 7B and continuing to block 720, the HOE 310 can be provided and affixed to the lens layer 420. For example, the HOE 310 can be affixed to the lens layer 420 via a pressure sensitive adhesive. Turning to FIG. 7C and continuing to block 730, the lens layer 430 can be provided and affixed to the HOE 310. For example, the lens layer 430 can be affixed to the HOE 310 via a pressure sensitive adhesive.

Turning to FIG. 7D and continuing to block 740 the lens layers 420 and 430 and the HOE 310 can be shaped to lens shape 300, or to an eyewear lens shape. It is noted, that the shape of the lens can have any shape suitable for the near eye display. For example, the shape may conform to a shape to mount to a frame (e.g., glasses frame, or the like). Furthermore, in some examples, more or less material (e.g., material 401, or the like) can be removed from the lens layers and HOE during shaping. Examples are not limited in this context. However, as a result of manufacturing and/or shaping, the edge 305 of the lens 300 may be exposed. In particular, the joint between the HOE 310 and the layers 420 and 430 can be exposed.

Turning to FIG. 7E and continuing to block 750, sealant 340 can be applied to the edge 305 to protect the HOE 310. In particular, sealant 340 can be applied to cover and/or protect the joint between the HOE 310 and the layers 420 and 430. In some examples, sealant can be applied by rolling the edge 305 on a wheel to apply the sealant 340 to the edge 305.

FIGS. 8A-8E depict an example technique 800 to form a lens. The technique 700 can be implemented to from the lens 300, for example, using mold 500. It is noted, the technique 800 is described with reference to the mold 500 and the lens layers 520 and 530 for purposes of clarity of presentation and not to be limiting. The technique 800 can begin at block 810. Turning to FIG. 8A and block 810, the mold 500 can be filled with material to form the lens layer 520. For example, the mold 500 can be filled (e.g., via port 540 depicted in FIG. 5, or the like) with a polymer and the polymer cured to form the lens layer 520. Turning to FIG. 8B and continuing to block 820, the HOE 310 can be provided and affixed to the lens layer 520. For example, the mold 500 can be opened to expose the lens layer 520 and the HOE 310 can be affixed to the lens layer 520 via a pressure sensitive adhesive. Turning to FIG. 8C and continuing to block 830, the mold 500 can be filled with additional material to form the lens layer 530. For example, the mold 500 can be filled (e.g., via port 540 depicted in FIG. 5, or the like) with a polymer and the polymer cured to form the lens layer 530 on the HOE 310. It is noted, molding can occur by pulling back one side of the mold so the cavity created by mold 500 may have the thickness of one of the mold halves (e.g., 520, 530, or the like). Subsequently, the HOE 310 can be applied and the cavities can accommodate both the HOE 310 and the second molded part.

Turning to FIG. 8D and continuing to block 840 the lens layers 520 and 530 and the HOE 310 can be shaped to lens shape 300, or to an eyewear lens shape. It is noted, that the shape of the lens can have any shape suitable for the near eye display. For example, the shape may conform to a shape to mount to a frame (e.g., glasses frame, or the like). Furthermore, in some examples, more or less material (e.g., material 401, or the like) can be removed from the lens layers and HOE during shaping. Examples are not limited in this context. However, as a result of manufacturing and/or shaping, the edge 305 of the lens 300 may be exposed. In particular, the joint between the HOE 310 and the layers 520 and 530 can be exposed.

Turning to FIG. 8E and continuing to block 850, sealant 340 can be applied to the edge 305 to protect the HOE 310. In particular, sealant 340 can be applied to cover and/or protect the joint between the HOE 310 and the layers 520 and 530. In some examples, sealant can be applied by rolling the edge 305 on a wheel to apply the sealant 340 to the edge 305.

Figure 9:
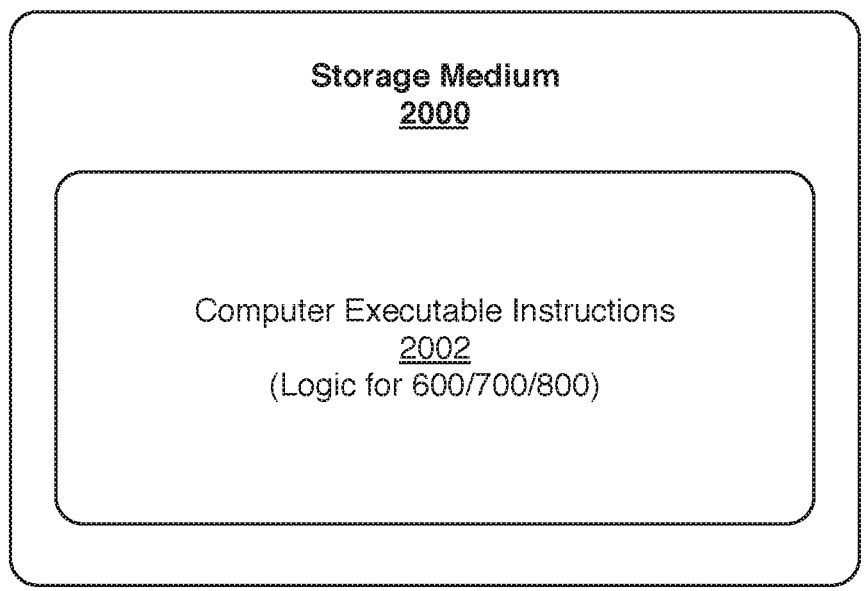
FIG. 9 illustrates an example computer readable medium.

FIG. 9 illustrates an embodiment of a storage medium 2000. The storage medium 2000 may comprise an article of manufacture. In some examples, the storage medium 2000 may include any non-transitory computer readable medium or machine readable medium, such as an optical, magnetic or semiconductor storage. The storage medium 2000 may store various types of computer executable instructions e.g., 2002). For example, the storage medium 2000 may store various types of computer executable instructions to implement technique 600. For example, the storage medium 2000 may store various types of computer executable instructions to implement technique 700. For example, the storage medium 2000 may store various types of computer executable instructions to implement technique 800.

Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 10:
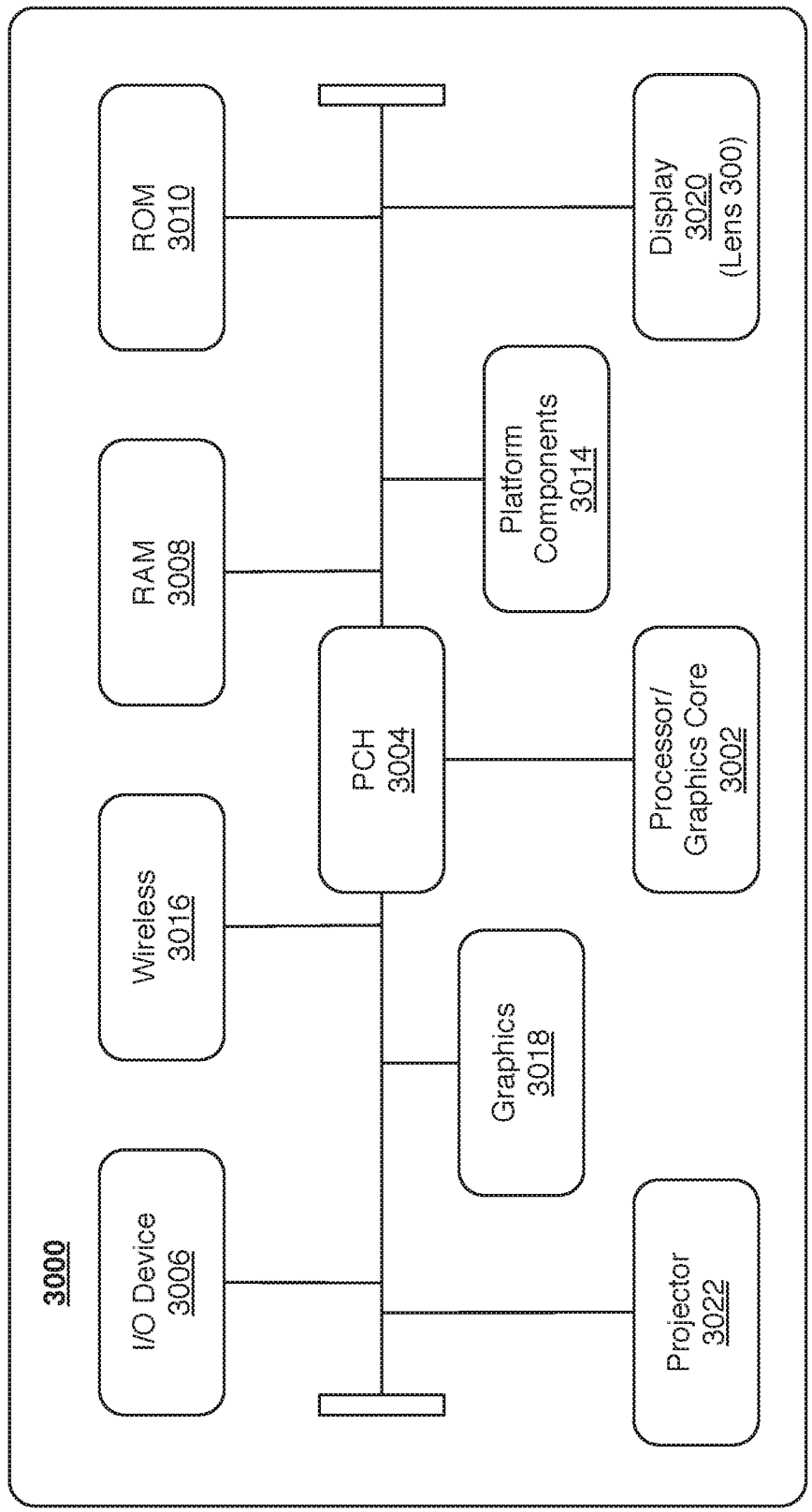
FIG. 10 illustrates a third example system.

FIG. 10 is a diagram of an exemplary system embodiment and in particular, depicts a platform 3000, which may include various elements. For instance, this figure depicts that platform (system) 3000 may include a processor/graphics core 3002, a chipset/platform control hub (PCH) 3004, an input/output (I/O) device 3006, a random access memory (RAM) (such as dynamic RAM (DRAM)) 3008, and a read only memory (ROM) 3010, display electronics 3020 (e.g., lens 300, or the like), projector 3022 (e.g., projector 110, or the like), and various other platform components 3014 (e.g., a fan, a cross flow blower, a heat sink, DTM system, cooling system, housing, vents, and so forth). System 3000 may also include wireless communications chip 3016 and graphics device 3018. The embodiments, however, are not limited to these elements.

As depicted, I/O device 3006, RAM 3008, and ROM 3010 are coupled to processor 3002 by way of chipset 3004. Chipset 3004 may be coupled to processor 3002 by a bus 3012. Accordingly, bus 3012 may include multiple lines.

Processor 3002 may be a central processing unit comprising one or more processor cores and may include any number of processors having any number of processor cores. The processor 3002 may include any type of processing unit, such as, for example, CPU, multi-processing unit, a reduced instruction set computer (RISC), a processor that have a pipeline, a complex instruction set computer (CISC), digital signal processor (DSP), and so forth. In some embodiments, processor 3002 may be multiple separate processors located on separate integrated circuit chips. In some embodiments processor 3002 may be a processor having integrated graphics, while in other embodiments processor 3002 may be a graphics core or cores.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other. Furthermore, aspects or elements from different embodiments may be combined.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. The detailed disclosure now turns to providing examples that pertain to further embodiments. The examples provided below are not intended to be limiting.

The disclosure can be implemented in a variety of embodiments. For example, the disclosure can be implemented in the non-exhaustive listing of example embodiments given below.

Example 1

A method to manufacture a wearable display lens, comprising: providing a lens having a holographic optical element (HOE) disposed between a first layer and a second layer of the lens, the HOE exposed along an edge of the lens; shaping the lens; and applying a sealant to the edge of the lens to cover the HOE.

Example 2

The method of example 1, shaping the lens comprising at least one of cutting the lens, grinding the lens, or polishing the lens.

Example 3

The method of example 1, shaping the lens comprising at least one of cutting the edge of the lens, grinding the edge of the lens, or polishing the edge of the lens.

Example 4

The method of example 1, applying the sealant to the edge of the lens comprising rolling the sealant onto the edge.

Example 5

The method of example 1, applying the sealant to the edge of the lens comprising dipping the edge of the lens in the sealant.

Example 6

The method of example 1, providing the lens comprising: providing the first layer and the second layer; applying the HOE to a back surface of the first layer; and applying the second layer to the HOE to place the HOE between the first and the second layer.

Example 7

The method of example 6, wherein the HOE is applied to the back surface of the first layer with a pressure sensitive adhesive.

Example 8

The method of example 1, providing the lens comprising: providing the first layer; applying the HOE to a back surface of the first layer; placing the first layer and the HOE into a mold; and filling the mold with a lens material to form the second layer the HOE.

Example 9

The method of example 8, providing the first layer comprising filling the mold with the lens material to form the first layer.

Example 10

The method of any one of examples 8 to 9, filling the mold comprising casting the lens material into the mold or injecting the lens material into the mold.

Example 11

The method of any one of examples 8 to 9, comprising applying at least one of heat or light to cure the lens material.

Example 12

The method of example 1, wherein the lens is shaped to have an eyewear lens shape.

Example 13

A lens manufactured according to the method of any one of examples 1 to 3 or examples 6 to 12.

Example 14

A projection system lens, comprising: a first lens layer; a holographic optical element (HOE) affixed to a back surface of the first lens layer; a second lens layer affixed to the HOE; and a sealant disposed on an edge of the lens, wherein joints between the first layer and the HOE and the second layer and the HOE are on the edge, the sealant to cover the joints.

Example 15

The projection system lens of example 14, wherein the HOE is affixed to the first lens layer and the second lens layer with a pressure sensitive adhesive.

Example 16

The projection system lens of example 14, wherein the sealant is a polymer.

Example 17

The projection system lens of example 16, wherein the polymer is chemically cured, light cured, or thermally cured.

Example 18

The projection system lens of example 14, wherein the first and second lens layers comprise polymer.

Example 19

The projection system lens of example 18, wherein the projection system lens is a glasses lens, a goggle lens, or a helmet visor.

Example 20

A system for projecting an image, the system comprising: a frame; a lens coupled to the frame, the lens comprising a holographic optical element (HOE) disposed between a first lens layer and a second lens layer and a sealant disposed on an edge of the lens, wherein joints between the first lens layer and the HOE and the second lens layer and the HOE are on the edge; and a projector coupled to the frame, the projector to project light onto the HOE.

Example 21

The system of example 20, wherein the first lens layer and the second lens layer cast or injected in a mold.

Example 22

The system of example 21, wherein the first lens layer and the second lens layer comprise polymer.

Example 23

The system of example 20, wherein the HOE is affixed to the first lens layer and the second lens layer with a pressure sensitive adhesive.

Example 24

The system of example 20, wherein the sealant is a polymer.

Example 25

The system of example 24, wherein the polymer is chemically cured, light cured, or thermally cured.

Example 26

The system of example 20, the HOE to reflect light incident on the HOE from a first angle and direction to project an image to an exit pupil.

Example 27

The system of any one of examples 20 to 26, wherein the lens is a glasses lens, a goggle lens, or a helmet visor.

Example 28

The system of example 27, wherein the frame is glasses, goggles, or a helmet.

Example 29

The system of any one of examples 20 to 26, comprising a battery electrically coupled to the projector.

Example 30

The system of any one of examples 20 to 26, comprising a graphic processor to receive an image information element to include an indication of an image and the send a display control signal to the projector to cause the projector to project one or more pixels corresponding to the image onto the HOE.

What is claimed is:

1. A method to manufacture a wearable display lens, comprising:
   providing a lens having a first holographic optical element (HOE) disposed between a first layer and a second layer of the lens, the HOE exposed along an edge of the lens, a first joint between the HOE and the first layer exposed along the edge of the lens, and a second joint between the HOE and the first layer exposed along the edge of the lens;
   removing material from at least the edge of the lens and the HOE to shape the lens, wherein shaping the lens further exposes the HOE along the edge of the lens; and
   applying a sealant to the edge of the lens to cover the exposed HOE, the exposed first joint, and the exposed second joint.

2. The method of claim 1, shaping the lens comprising at least one of cutting the lens, grinding the lens, or polishing the lens.

3. The method of claim 1, shaping the lens comprising at least one of cutting the edge of the lens, grinding the edge of the lens, or polishing the edge of the lens.

4. The method of claim 1, applying the sealant to the edge of the lens comprising rolling the sealant onto the edge.

5. The method of claim 1, applying the sealant to the edge of the lens comprising dipping the edge of the lens in the sealant.

6. The method of claim 1, providing the lens comprising:
   providing the first layer and the second layer;
   applying the HOE to a back surface of the first layer; and
   applying the second layer to the HOE to place the HOE between the first and the second layer.

7. The method of claim 6, wherein the HOE is applied to the back surface of the first layer with a pressure sensitive adhesive.

8. The method of claim 1, providing the lens comprising:
   providing the first layer;
   applying the HOE to a back surface of the first layer;
   placing the first layer and the HOE into a mold; and
   filling the mold with a lens material to form the second layer the HOE.

9. The method of claim 8, providing the first layer comprising filling the mold with the lens material to form the first layer.

10. The method of claim 8, filling the mold comprising casting the lens material into the mold or injecting the lens material into the mold.

11. The method of claim 8, comprising applying at least one of heat or light to cure the lens material.

12. The method of claim 1, wherein the lens is shaped to have an eyewear lens shape.

13. A lens manufactured according to the method of claim 1.

14. A projection system lens, comprising:
a first lens layer;
a holographic optical element (HOE) affixed to a back surface of the first lens layer;
a second lens layer affixed to the HOE; and
a sealant disposed on an edge of the lens, wherein joints between the first layer and the HOE and the second layer and the HOE are on the edge, the sealant to cover the joints and the HOE.

15. The projection system lens of claim 14, wherein the HOE is affixed to the first lens layer and the second lens layer with a pressure sensitive adhesive.

16. The projection system lens of claim 14, wherein the sealant is a polymer.

17. A system for projecting an image, the system comprising:
a frame;
a lens coupled to the frame, the lens comprising a holographic optical element (HOE) disposed between a first lens layer and a second lens layer and exposed along an edge of the lens, wherein joints between the first lens layer and the HOE and the second lens layer and the HOE are on the edge, the lens further comprising a sealant disposed along the edge, the sealant to cover the joint between the first lens layer and the HOE, the joint between the second layer and the HOE, and the HOE; and
a projector coupled to the frame, the projector to project light onto the HOE.

18. The system of claim 17, wherein the first lens layer and the second lens layer are cast or injected in a mold.

19. The system of claim 17, wherein the HOE is affixed to the first lens layer and the second lens layer with a pressure sensitive adhesive.

20. The system of claim 17, wherein the sealant is a polymer.

21. The system of claim 17, wherein the lens is a glasses lens, a goggle lens, or a helmet visor.

22. The system of claim 21, wherein the frame is glasses, goggles, or a helmet.

23. The system of claim 17, comprising a battery electrically coupled to the projector.

24. The system of claim 17, comprising a graphic processor to receive an image information element to include an indication of an image and to send a display control signal to the projector to cause the projector to project one or more pixels corresponding to the image onto the HOE.

* * * * *